United States Patent [19]

Toth et al.

[11] Patent Number: 4,524,630
[45] Date of Patent: Jun. 25, 1985

[54] MECHANICAL FORCE AMPLIFIER

[76] Inventors: Leo A. Toth, 17030 Joshua Tree Ct., Sun City, Ariz. 85373; David M. Toth, 1955 Hulmelville Rd., Cornwells Heights, Pa. 19020

[21] Appl. No.: 536,859

[22] Filed: Sep. 29, 1983

[51] Int. Cl.³ ............................................. F16H 25/18
[52] U.S. Cl. ........................................ 74/110; 254/104
[58] Field of Search ................. 74/99 A, 110; 254/104

[56] References Cited

U.S. PATENT DOCUMENTS 1,218,771  3/1917  Hoeschen et al. ..................... 74/110
3,774,352  11/1973  Weber .............................. 254/104 X
4,208,045  6/1980  Rowe et al. ....................... 254/104 X
4,382,580  5/1983  Hellander ......................... 254/104 X Primary Examiner—Stephen F. Husar
Attorney, Agent, or Firm—Cahill, Sutton & Thomas

[57] ABSTRACT

A compact unitary device provides a mechanically amplified rectilinear translational output force in response to a translational input force. The device includes a housing, a slide block, a ram and anti-friction elements disposed intermediate the operatively coupled elements to reduce friction therebetween and minimize imposition of side loads on the ram resulting from operation of the device.

48 Claims, 7 Drawing Figures

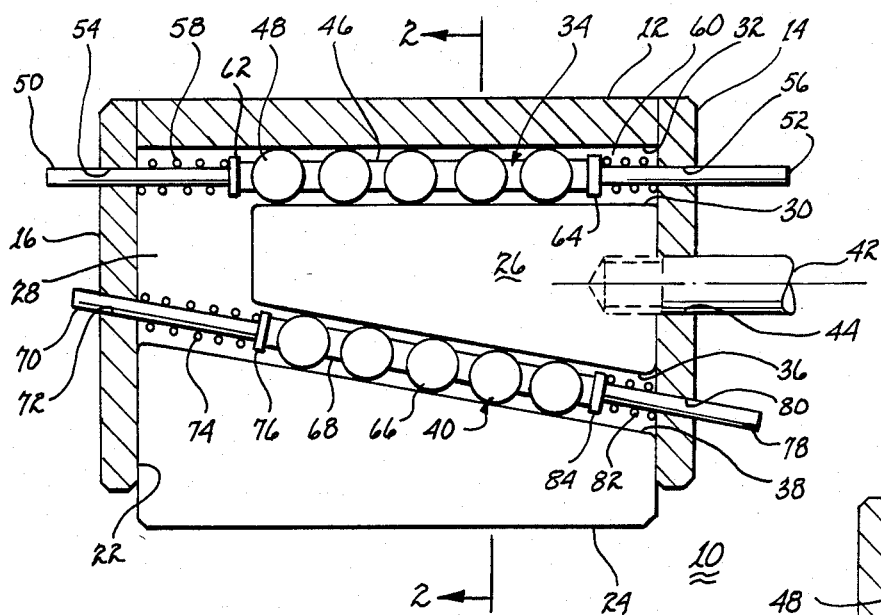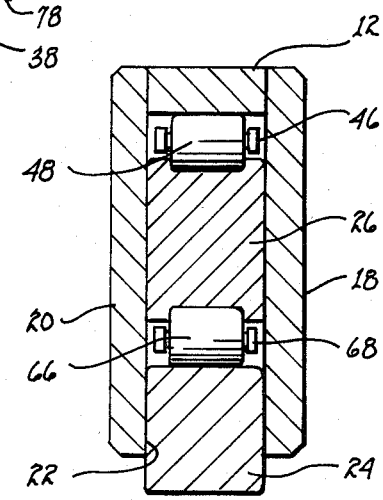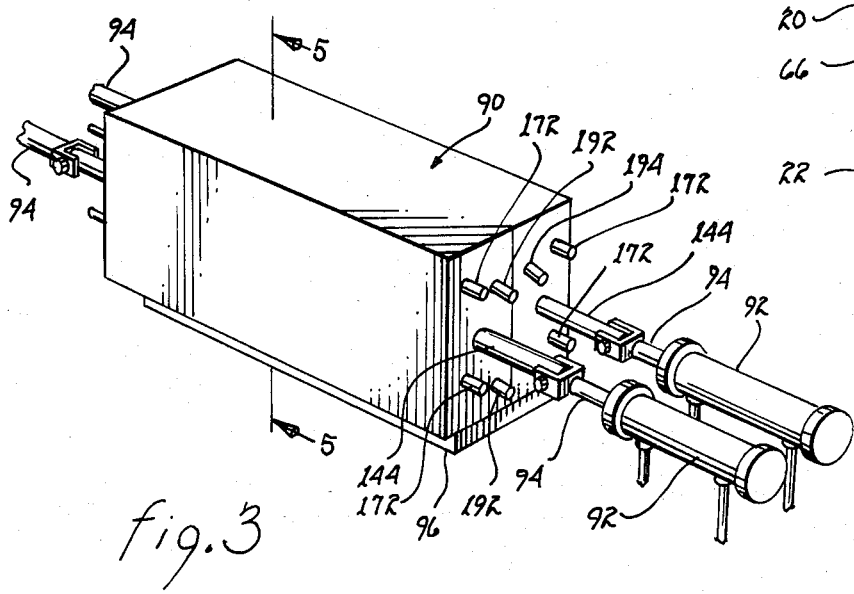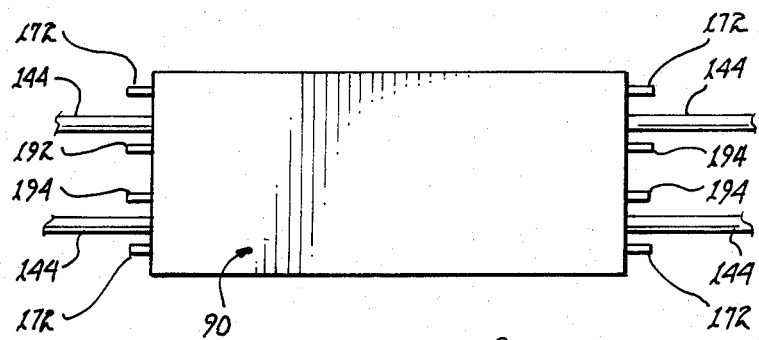

MECHANICAL FORCE AMPLIFIER

The present invention relates to mechanical devices for amplifying a translational input force.

Since time immemorial wedges have been employed to reposition an element a distance commensurate with the distance the wedge is moved times the sine of the angle of the wedge. Various devices have been developed which incorporate the principle of the wedge. One such device is described in U.S. Pat. No. 3,774,352. Herein, a wedge bearing against a pressure plate, is moveable by operation of a first threaded bolt. A ram, slidable within an aperture in a cover plate, is operatively supported within a depression in the center of the wedge. A second threaded bolt extends from the ram for coarse positional adjustment of the element to be positioned. In operation, the device is employed to align or position a work piece by locating the device intermediate a work table and the work piece. Coarse adjustment to engage the work piece is effected by the second threaded bolt extending from the ram and fine positional adjustment of the work piece with respect to a point of reference is effected by turning the first threaded bolt to effect translation of the wedge and resulting finely adjusted extension of the ram. Since the load imposed by the ram is concentrated upon a very limited centrally located area of the wedge, the loads capable of being imposed without damage to the wedge are limited. Hence, utility of the device is limited to and intended for fine positional adjustment of a work piece and not as a device for applying an amplified force to an element to be translated.

U.S. Pat. No. 1,499,560 is directed to a jack for automobiles and the like; a jack screw translates a plurality of ganged wedges having opposed angled surfaces for displacing opposed load bearing surfaces of the jack.

U.S. Pat. No. 2,506,525 describes a bearing assembly invented by the present inventor, which bearing assembly is a ladder bearing to accommodate axial movement.

U.S. Pat. No. 4,208,045 discloses paired wedges moveable toward and away from one another by operation of a jack screw, which paired movement translationally displaces a ram from an element having a pair of inclined surfaces cooperating with the paired wedges.

The present invention is directed to a device for converting a translational input force into an amplified translational output force to apply a force to an object. Since the device is intended to be an active device for providing an amplified output force rather than a device for simply positioning an element with great accuracy, efficiency of the device is of substantial import. Concomitantly, repetitive movement of the operatively engaged elements dictates reduction of friction to minimize side loads and wear. Roller bearings, positionally maintained by coating springs, are disposed intermediate the cooperating bearing surfaces to reduce friction therebetween; the roller bearings include orthogonally oriented bearings to accommodate imposed loads having bi-directional components.

It is therefore a primary object of the present invention to provide a device for amplifying a translational input force.

Another object of the present invention is to provide a device for mechanically amplifying an input force.

Yet another object of the present invention is to provide a device for providing an amplified output force in a direction different from the direction of an applied input force.

Still another object of the present invention is to provide self-centering bearing surfaces disposed intermediate operatively engaged elements of a force multiplying device.

A yet further object of the present invention is to provide bearing means disposed intermediate operative surfaces of a force multiplying device to accommodate forces having bi-directional components.

A still further object of the present invention is to provide cascadeable force multiplying devices.

These and other objects of the present invention will become apparent to those skilled in the art as the description thereof proceeds.

The present invention will be described with greater specificity and clarity with reference to the drawings, in which:

FIG. 1 is a partial cross-sectional view of the force amplifying device.

FIG. 2 is a cross-sectional view taken along lines 2—2, as shown in FIG. 1.

FIG. 3 is an isometric view of a variant of the present invention;

FIG. 4 is a top view of the variant;

Figure 5:
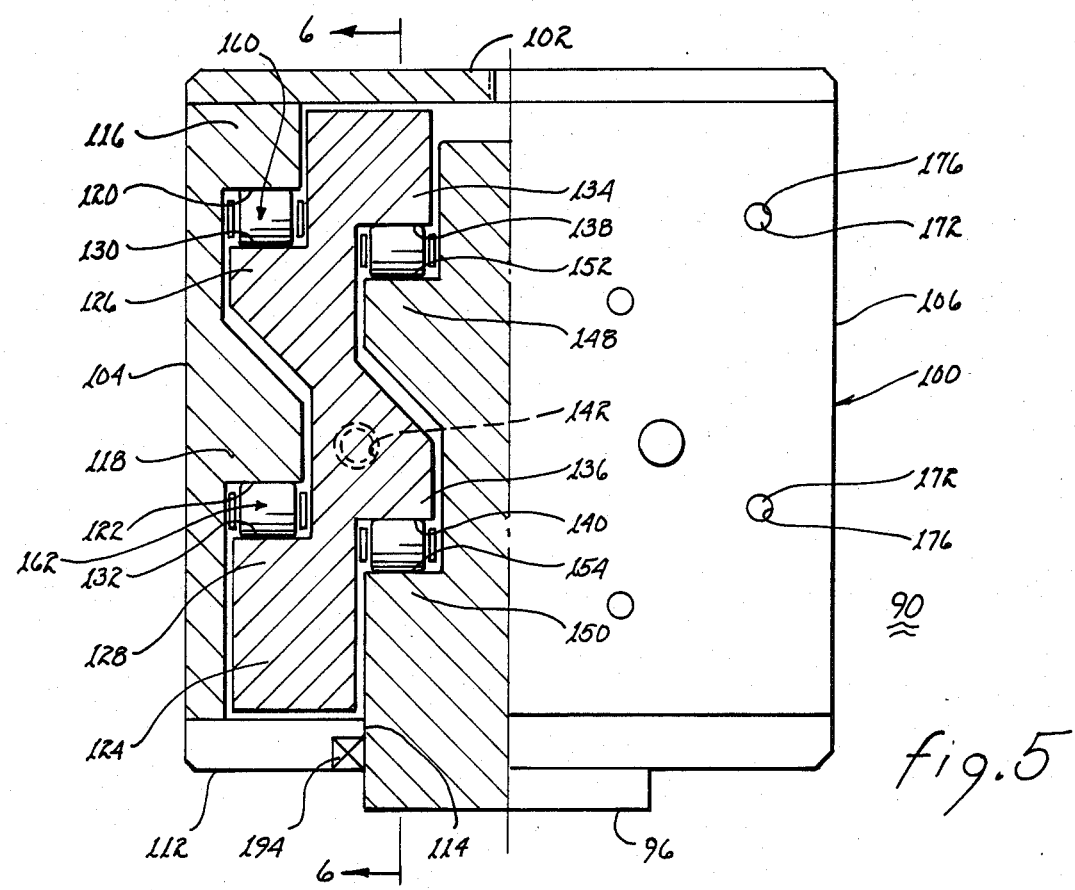
FIG. 5 is a partial cross-sectional view taken along lines 5—5, as shown in FIG. 3.

Referring to FIG. 1 there is shown a mechanical force amplifier device 10 having a base 12 and opposed side walls 14, 16. Further opposed side walls 18, 20 are illustrated in FIG. 2. These pairs of side walls define a rectangular channel 22 for receiving and guiding ram 24 during translation thereof along its longitudinal axis.

A slide block 26 is moveably disposed within cavity 28 defined by the base and opposed pairs of side walls. The movement of the slide block is limited by side walls 18, 20 to movement between side walls 14, 16. The slide block includes a first bearing surface 30 configured planar with a bearing surface 32 of base 12. To reduce friction intermediate bearing surfaces 30, 32, anti-friction means, such as roller bearing 34, is disposed intermediate these bearing surfaces.

The slide block includes a second bearing surface 36, which bearing surface is inclined with respect to the plane defined by first bearing surface 30. Ram 24 includes a bearing surface 38, which bearing surface lies in a plane parallel to the plane of second bearing surface 36. An anti-friction element, such as second roller bearing 40 may be disposed intermediate second bearing surface 36 and ram bearing surface 38.

Rectilineal translation of slide block 26 may be effected by arm 42 threadedly engaged to the slide block and extending external of device 10 through aperture 44 in side wall 14.

First roller bearing 34 includes a cage 46 rotatably supporting a plurality of rollers 48. The caged rollers are retained in operative relationship intermediate base 12, which may be referred to by its operative function as a pressure reactor block, and the slide block by means of opposed pins 50, 52 extending external of the housing through apertures 54, 56, respectively. Spring means, such as coil springs 58, 60, are mounted upon pins 50, 52 and bear against heads 62, 64 of the respective pins. The coil springs, bearing against their respective side walls, tend to maintain roller bearing 34 centrally located between side walls 14 and 16 through equalization of compressive forces of the springs.

Second roller bearing 40 is similar to first roller bearing 34 and includes rollers 66 mounted within cage 68, pin 70 extending through aperture 72 in side wall 16 and supporting a coil spring 74 intermediate head 76 and the side wall and pin 78 extending through aperture 80 in side wall 15 supporting coil spring 82 intermediate head 84 and the side wall. Thereby, second roller bearing 40 is biasingly maintained centered between side walls 14, 16 intermediate slide block 26 and ram 24.

In operation, a translational force exerted upon arm 42 will result in translational movement of slide block 26. Such translational movement of the slide block will be converted to movement of ram 24 along its longitudinal axis in response to sliding interaction between second bearing surface 36 of the slide block and bearing surface 38 of the ram. It may be noted that the degree of force amplification provided by device 10 is a function of the sine of the angle between the planes defined by first bearing surface 30 and second bearing surface 36 of the slide block. The resulting ratio is a function of the amplification or multiplication of the output force provided by ram 24 in comparison to the input force exerted upon arm 42. Thereby, a relatively modest input force applied to arm 42 can be converted to an amplified or multiplied output force exerted by the ram to move or reposition a piece of equipment, structure or other element.

It may be noted that because of the rolling motion of the roller bearings, the extent of their translation will be a distance one half of the distance of the corresponding movement of slide block 26. The use of roller bearings, as opposed to a different type of anti-friction element, minimizes to the greatest extent possible side loads upon the housing of device 10 which reduces the required robustness of the side walls and increases the efficiency of the device.

Referring jointly to FIGS. 3, 4, 5 and 6, there is shown a first variant 90. Herein, a pair of slide blocks translationally actuated by hydraulic rams 92 acting through arms 94, provide translatory motion to a single ram 96. With such arrangement, a relatively low individual input force exerted by each actuator may be used while providing a relatively high output force exertable by the ram.

Figure 6:
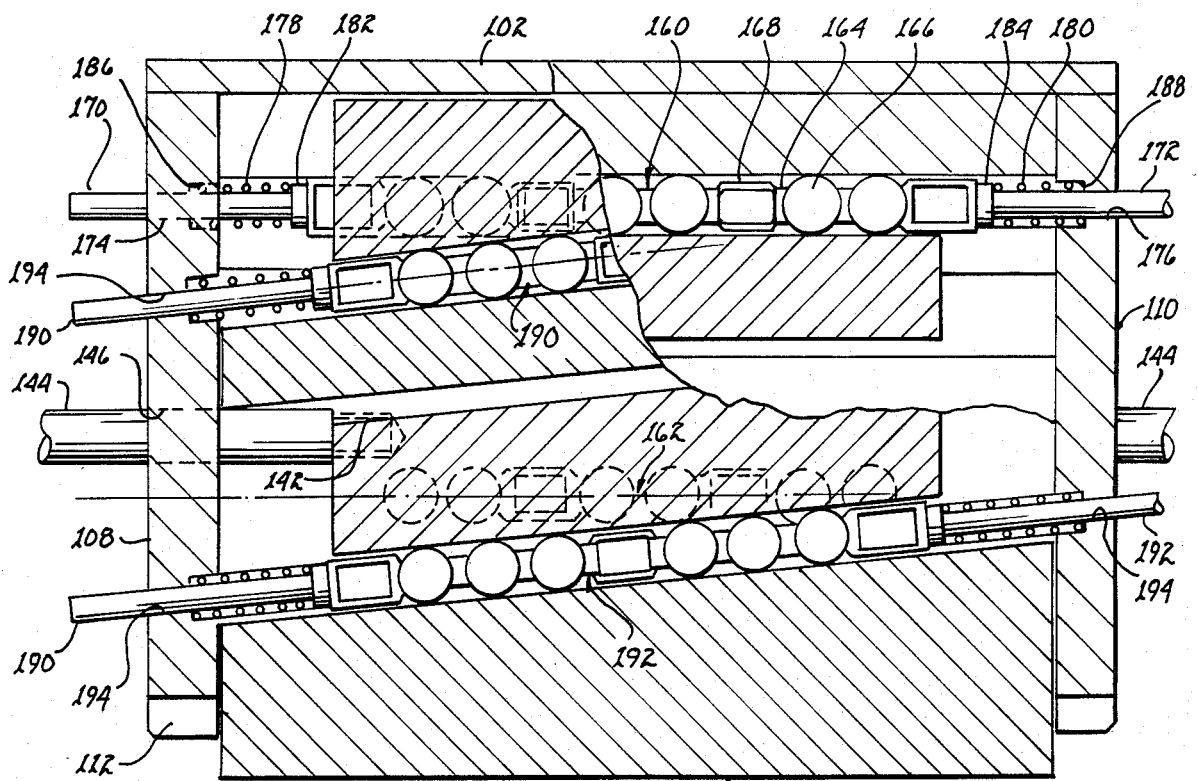
FIG. 6 is a partial cross-sectional view taken along lines 6—6, as shown in FIG. 5.

As particularly illustrated in FIGS. 5 and 6, housing 100 of variant 90 includes a base 102, first opposed pairs of side walls 104, 106, a second pair of opposed side walls 108, 110. A cover 112, having an aperture 114 commensurate with the cross-sectional configuration of ram 96, may be attached to the respective edges of the side walls.

Side walls 104, 106 include shoulders 116, 118 defining bearing surfaces 120, 122. Each slide block of the pair of slide blocks and of which only slide block 124 is shown, includes a first pair of shoulders 126, 128 for supporting first bearing surfaces 130, 132. A second pair of shoulders 134, 136 support second bearing surfaces 138, 140. The slide block may include one or a pair of opposed threaded cavities 142 for threadedly receiving the end of an actuating arm 144 extending through an aperture 146 in side wall 108. Each side of a pair of opposed sides of ram 96 includes shoulders 148, 150 to provide bearing surface 152, 154.

Referring particularly to FIG. 6, a first set of roller bearings 160, 162, are disposed intermediate shoulders 116, 126 and 118, 128 for engaging opposed bearing surfaces 120, 130 and 122, 132. Each roller bearing set includes a cage 164 for rotatably supporting a plurality of first rollers 166 and a plurality of second rollers 168. The second rollers are angularly oriented 90° with respect to the axis of rotation of the first rollers to accommodate any laterally imposed loads between the slide block and its respective slide wall on the ram. Roller bearing set 160 is centrally biased along bearing surface 120 by opposing pins 170, 172 extending through apertures 174, 176 in side walls 108, 110, respectively. Coil springs 178, 180 are located about the respective pins internal of side walls 108, 110 and bear against heads 182, 184, respectively. For purposes of retention and positioning, cavities 186, 188 may be developed as a part of apertures 174, 176, respectively, to receive one end of the respective coil springs. These spring loaded pins will tend to maintain the respective roller bearing set essentially centrally located as a consequence of any unequal spring forces exerted by the opposing coil springs.

The planes of opposed bearing surfaces 138, 152 and 140, 154 are parallel or planar with one another and inclined with respect to bearing surfaces 120, 132 and 122, 132, as particularly shown in FIG. 6. Further roller bearing sets 190, 192 are located intermediate these paired inclined bearing surfaces. These roller bearing sets have essentially the same structure as described above with respect to roller bearing set 160. Necessarily, the respective apertures in the side walls for the pins are slanted at an angle commensurate with the incline angle of the bearing surfaces. For purposes of simplicity in the numbering system, common and corresponding elements of the several roller bearing sets have been assigned the same reference numerals.

In a variant of the embodiment illustrated in FIGS. 5 and 6, the inclined bearing surfaces of the second slide block (not shown) and the corresponding inclined bearing surfaces of the ram (not shown) may be equally but oppositely inclined to bearing surfaces 138, 140 and 152, 154, respectively. With such arrangement, opposing forces can be applied to the respective slide blocks and the slide blocks will act in concert to reposition ram 96.

As may be surmised from the discussion attendant operation of the device shown in FIGS. 1 and 2, translatory movement of the pair of slide blocks will result in a proportional movement of ram 96 along its longitudinal axis. However, the output force exerted by ram 96 is amplified over or a multiple of the input force applied to arm(s) 144.

A seal 194 may be disposed intermediate aperture 114 of cover plate 112 and ram 96 to prevent incursion of contaminates within housing 100.

Figure 7:
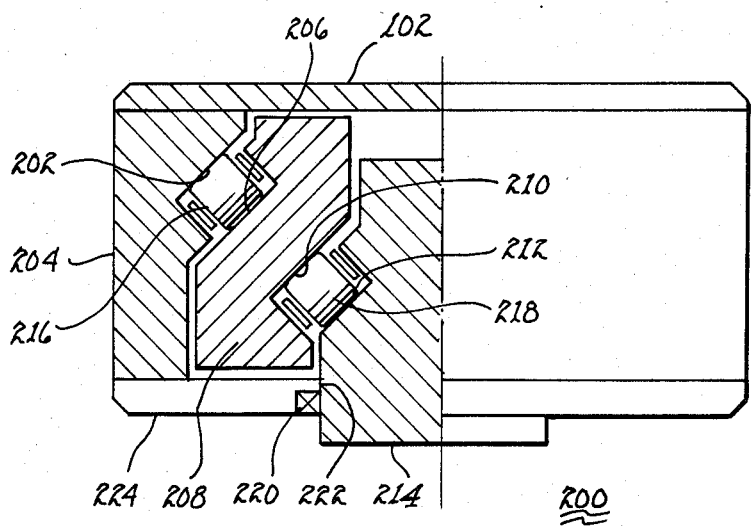
FIG. 7 illustrates a further variant of the invention.

Referring to FIG. 7, there is shown a further variant 200. The orientation of bearing surface 202 in side wall 204, bearing surface 206 in slide block 208, bearing surface 210 in the slide block and bearing surface 212 in ram 214 are canted with respect to the longitudinal and lateral axis of the ram. The degree of angularity of the canted surfaces with respect to one another must be calculated to place the slide block in equilibrium under load conditions. Alternatively, roller bearing sets 216, 218 and the corresponding bearing surfaces are canted at the same angle and located in opposed relationship, as shown. Thereby, the opposing forces generated under load will cancel each other and the slide block will be maintained in equilibrium under load conditions.

Roller bearing sets 216 and 218 disposed intermediate the respective bearing surfaces are constructed like those shown in FIG. 6. Variant 200 may include a seal 220 disposed intermediate aperture 222 of cover plate 224 to bear against the corresponding surfaces of ram 214.

Variant 200 is particularly adapted for use in environments wherein laterally imposed loads upon either the housing or the ram are relatively severe with respect to the output force available from the ram. It is to be understood that the variant illustrated primarily in FIGS. 5 and 6, may be modified or adapted to embody the angular relationships particularly depicted and described with respect to FIG. 7.

To increase the extent of movement of the element to be acted upon, a plurality of devices 10 may be cascaded in a manner wherein the output force of one device is applied as the input force of a second device. Alternatively, the ultimate output force can be further amplified by cascaded two or more of devices 10.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A mechanical force amplifying device, said device comprising in combination:
   (a) a housing, said housing including a base, at least one sidewall and a bearing surface formed in said housing;
   (b) a slide block disposed within said housing and moveable in response to an input force, said slide block including a first bearing surface and a second bearing surface, said second bearing surface being inclined with respect to said first bearing surface;
   (c) a longitudinally moveable ram laterally retained by at least said one sidewall for providing an output force, said ram including a bearing surface parallel with said second slide block bearing surface and a surface for imparting the output force;
   (d) first roller bearing means disposed intermediate said housing bearing surface and said first slide block bearing surface and second roller bearing means disposed intermediate said second slide block bearing surface and said ram bearing surface; and
   (e) first means for biasing said first roller bearing means to the center of said housing bearing surface and second means for biasing said second roller bearing means to the center of said ram bearing surface;

whereby, the output force is an amplification of the input force in a ratio inversely proportional to the sine of the angle between said first slide block bearing surface and said second slide block bearing surface.

2. The device as set forth in claim 1 wherein said housing bearing surface is disposed in said base.

3. The device as set forth in claim 1 wherein said sidewall includes side walls circumscribing said ram for guiding said ram upon movement along the longitudinal axis of said ram.

4. The device as set forth in claim 3 wherein said housing bearing surface is disposed in said base.

5. The device as set forth in claim 3 wherein each of said first and second roller bearing means includes a plurality of rollers, a cage for caging said plurality of rollers, first spring means disposed intermediate one end of said cage and a first side wall and second spring means disposed intermediate another end of said cage and a second side wall.

6. The device as set forth in claim 5 wherein each of said first and second spring means comprises a coil spring.

7. The device as set forth in claim 6 including a translatable pin for penetrably supporting each said coil spring, guide means for guiding each said pin during translation and means for compressing the respective one of said coil springs upon movement theretoward of the respective one of said cages.

8. The device as set forth in claim 7 wherein said guide means includes guideway disposed in the respective one of said side walls for receiving said pin.

9. The device as set forth in claim 8 wherein each said guideway includes an aperture.

10. The device as set forth in claim 1 including a pair of said slide blocks, each said slide block of said pair of slide blocks being disposed on one side of a pair of opposed sides of said ram.

11. The device as set forth in claim 10 wherein each said slide block includes a pair of said first bearing surfaces and a pair of said second bearing surfaces.

12. The device as set forth in claim 11 wherein said housing includes a pair of housing bearing surfaces for operative engagement with each pair of said first slide block bearing surfaces.

13. The device as set forth in claim 12 wherein one pair of said pairs of housing bearing surfaces is disposed in each side wall of an opposed pair of housing side walls.

14. The device as set forth in claim 11 wherein said ram includes a pair of said ram bearing surfaces for operative engagement with each pair of said second slide block bearing surfaces.

15. The device as set forth in claim 14 wherein said housing includes a pair of housing bearing surfaces for operative engagement with each pair of said first slide block bearing surfaces.

16. The device as set forth in claim 15 wherein one pair of said pairs of housing bearing surfaces is disposed in each side wall of an opposed pair of housing side walls.

17. The device as set forth in claim 16 wherein each bearing surface of said pair of housing bearing surfaces is formed upon a shoulder of the respective one of said side walls.

18. The device as set forth in claim 17 wherein each of the first and second bearing surfaces of each said slide block is formed upon a shoulder of the respective one of said pair of slide blocks.

19. The device as set forth in claim 18 wherein each bearing surface of said ram is formed upon a shoulder of said ram.

20. The device as set forth in claim 12 wherein the plane of each said pair of housing bearing surfaces is oriented perpendicular to the longitudinal axis of said ram.

21. The device as set forth in claim 12 wherein the plane of each said pair of second slide block bearing surfaces is inclined with respect to the longitudinal axis of said ram.

22. The device as set forth in claim 14 wherein each of said first and second roller bearing means includes a plurality of rollers, a cage for caging said plurality of rollers, first spring means disposed intermediate one end of said cage and a first side wall and second spring means disposed intermediate another end of said cage and a second side wall.

23. The device as set forth in claim 22 wherein a number of said plurality of rollers in each said cage are angularly displaced with respect to the remaining ones of said plurality of rollers by 90° to accommodate force couples created during operation of said device.

24. The device as set forth in claim 10 wherein each said slide block includes said first bearing surface and said second bearing surface.

25. The device as set forth in claim 24 wherein said housing includes one of said housing bearing surfaces for operative engagement with each of said first slide block bearing surfaces.

26. The device as set forth in claim 25 wherein one of said housing bearing surfaces is disposed in each side wall of an opposed pair of housing side walls.

27. The device as set forth in claim 26 wherein said ram includes one of said ram bearing surfaces for operative engagement with each of said second slide block bearing surfaces.

28. The device as set forth in claim 27 wherein each said housing bearing surface is formed upon a shoulder of the respective one of said side walls.

29. The device as set forth in claim 28 wherein each said first and second slide block bearing surfaces is formed upon a shoulder of the respective one of said pair of slide blocks.

30. The device as set forth in claim 29 wherein each said ram bearing surface is formed upon a shoulder of said ram.

31. The device as set forth in claim 30 wherein the plane of each said pair of housing bearing surfaces is oriented perpendicular to the longitudinal axis of said ram.

32. The device as set forth in claim 30 wherein the planes of said second slide block bearing surfaces and said ram bearing surfaces are parallel with one another and inclined with respect to the planes of said housing bearing surfaces.

33. The device as set forth in claim 26 wherein each of said first and second roller bearing means includes a plurality of rollers, a cage for caging said plurality of rollers, first spring means disposed intermediate one end of said cage and a first side wall and second spring means disposed intermediate another end of said cage and a second side wall.

34. The device as set forth in claim 33 wherein a number of said plurality of rollers in each said cage are angularly displaced with respect to the remaining ones of said plurality of rollers by 90° to accommodate force couples created during operation of said device.

35. The device as set forth in claim 32 wherein the planes of said housing bearing surfaces and said first slide block bearing surfaces are centered with respect to the lateral and longitudinal axis of said ram.

36. A mechanical force amplifying device, said device comprising in combination:
(a) a housing having at least one bearing surface disposed on each of two opposed side walls of said housing;
(b) a pair of slide blocks disposed within said housing, each said slide block being translatable in response to an input force, each said slide block including a first bearing surface for operative engagement with said housing bearing surface disposed in one side wall of said housing and a second bearing surface, said second bearing surface being inclined with respect to said first bearing surface; and
(c) a longitudinally moveable ram disposed intermediate said pair of slide blocks for providing an output force in response to translation of said pair of slide blocks, said ram including a pair of bearing surfaces, each of said ram bearing surfaces being operatively engaged with one of said second slide block bearing surfaces;

whereby, the output force is an amplification of the input force in a ratio inversely proportional to the sine of the angle between said first slide block bearing surface and said second slide block bearing surface.

37. The device as set forth in claim 36 wherein the plane of said housing bearing surfaces is oriented perpendicular to the longitudinal axis of said ram.

38. The device as set forth in claim 36 wherein the plane of said second slide block bearing surfaces is inclined with respect to the longitudinal axis of said ram.

39. The device as set forth in claim 36 wherein: (a) each said slide block includes a pair of said first bearing surfaces and a pair of said second bearing surfaces; (b) said housing includes a pair of housing bearing surfaces for operative engagement with said pair of said first slide block bearing surfaces; and (c) said ram includes a pair of said ram bearing surfaces for operative engagement with said pair of second slide block bearing surfaces.

40. The device as set forth in claim 39 wherein the plane of said pair of housing bearing surfaces is oriented perpendicular to the longitudinal axis of said ram.

41. The device as set forth in claim 39 wherein the plane of each pair of second slide block bearing surfaces is inclined with respect to the longitudinal axis of said ram.

42. The device as set forth in claim 39 wherein each bearing surface of said pair of housing bearing surfaces is formed upon a shoulder of the respective one of said sidewalls.

43. The device as set forth in claim 42 wherein each of the first and second slide block bearing surfaces is formed upon a shoulder of the respective one of said pair of slide blocks.

44. The device as set forth in claim 43 wherein each bearing surface of said ram is formed upon a shoulder of said ram.

45. The device as set forth in claim 44 wherein the plane of said pair of housing bearing surfaces is oriented perpendicular to the longitudinal axis of said ram.

46. The device as set forth in claim 44 wherein the plane of said pair of second slide block bearing surfaces is inclined with respect to the longitudinal axis of said ram.

47. The device as set forth in claim 36 wherein the planes of said housing bearing surfaces, said first and second slide block bearing surfaces and said ram bearing surfaces are canted with respect to the lateral and longitudinal axis of said ram.

48. The device as set forth in claim 37 wherein the planes of said pair of housing bearing surfaces, said pairs of first and second slide block bearing surfaces and said pair of ram bearing surfaces are canted with respect to the lateral and longitudinal axis of said ram.

* * * * *